March 28, 1950     P. KELLEY     2,501,679
EGG PEELING DEVICE
Filed March 26, 1946
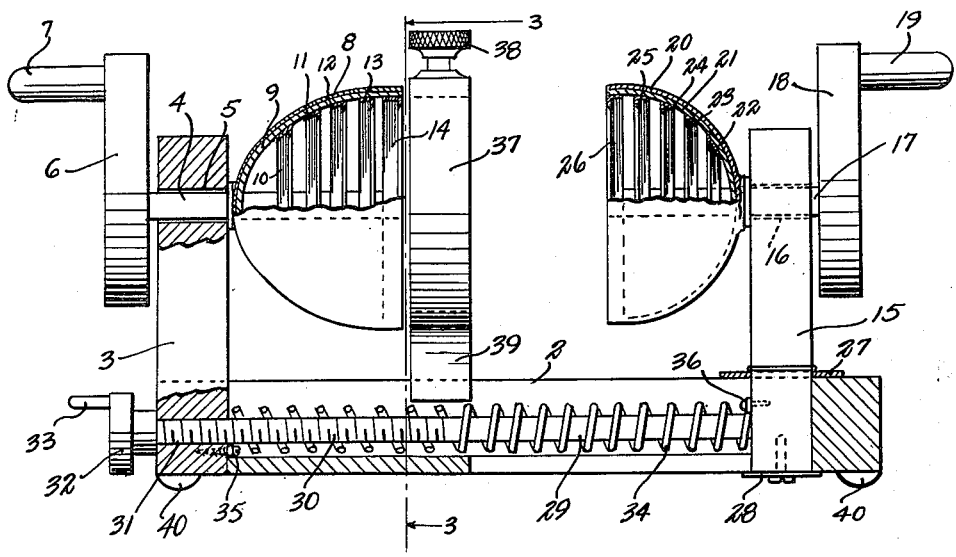
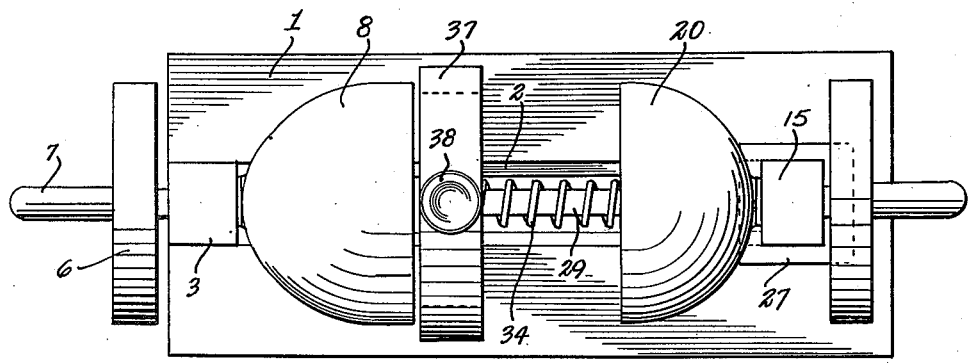
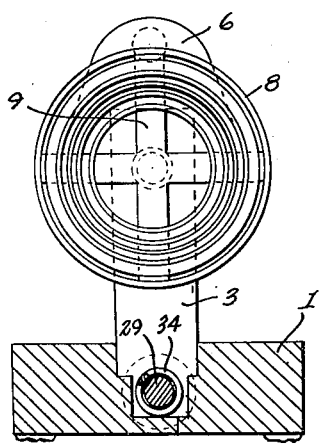
Inventor
PHILLIP KELLEY, Patented Mar. 28, 1950

2,501,679

UNITED STATES PATENT OFFICE 2,501,679

EGG PEELING DEVICE

Phillip Kelley, Haverhill, Mass.

Application March 26, 1946, Serial No. 657,261

1 Claim. (Cl. 146—2)

This invention relates to an egg peeling device and more particularly to an egg peeling device for cutting or scoring egg shells to facilitate peeling.

An object of this invention is to provide an improved egg peeling device having knives for simultaneously cutting the egg shell circumferentially about the egg in several places.

Another object of this invention is to provide an improved egg peeling device having ring-shaped knives rotatable about the longitudinal axis of an egg for cutting the egg shell to facilitate shelling or peeling.

It is a further object of this invention to provide an egg peeler having a plurality of ring-shaped knives having varying diameters and disposed to conform to the contour of an average-sized egg so that a plurality of cuts can be made simultaneously about the egg.

Still another object of this invention is to provide an egg peeling device having a pair of complemental cups conforming to the contour of an average egg and adapted to receive an egg, the cups being provided with knives for scoring the egg at right angles to the longitudinal axis of the egg.

Other objects and advantages of the present invention will become apparent from the following specification and claim and from the accompanying drawings illustrating the invention, wherein:

Figure 1 is an elevational view, partly in section, of the egg peeler of this invention;

Figure 2 is a plan view of the egg peeler; and

Figure 3 is a sectional view taken on line 3—3 of Figure 1.

Referring to the drawing, 1 represents a base member having a longitudinal slot 2 therein for a purpose to be described hereinafter. At the left end of the base, as viewed in Figure 1, there is provided an upstanding brace 3, fixed to or integral with the base member 1. Mounted for rotation in brace 3 near its top is a shaft 4, journalled in bearing 5 extending through the brace. At the outer end of shaft 4 is fixed a wheel or disc 6 having a handle 7 fixed thereon whereby the shaft 4 may be manually rotated about its axis. To the inner end of shaft 4, there is fixed a shell or cup 8, reinforced by straps or ribs 9 on the interior thereof.

In the drawing four straps or ribs are illustrated but it is obvious that a greater or lesser number may be used within the scope of this invention. To the straps or ribs 9, there are fixed a plurality of ring-shaped cutting knives 10, 11, 12, 13 and 14. Five cutting knives are used in the particular embodiment illustrated but this is by way of example only, since a greater or lesser number may obviously be used depending on the number of cuts desired. The cup 8, ribs 9 and cutters 10–14 are dimensioned and disposed so that the circumferential cutting edges of the cutters describe a surface conforming to the contour of approximately half of an average-sized egg.

Slidably mounted in slot 2 is another upright brace 15 shown at the right in Figure 1. Journalled in bearing 16, near the top of this brace, is another shaft 17, similar to shaft 4, and carrying a wheel or disc 18 and handle 19 for manual rotation of the shaft 17. The inner end of shaft 17 has fixed thereto a shell or cup 20, similar to shell 8, having ribs or straps 21, similar to ribs 9, and ring-shaped cutting knives 22, 23, 24, 25 and 26, similar to knives 10–14. The cup or shell 20, ribs 21 and cutters 22–26 are dimensioned and disposed so that the circumferential cutting edges of the cutters describe a surface conforming to the contour of approximately the remaining half of an average-sized egg.

The brace 15 has suitably fixed thereto flanges 27 and 28 abutting the top and bottom surfaces, respectively, of base member 1 to prevent vertical movement of the brace and yet permit sliding movement of the brace along slot 2, so that shell 20 can move to and from its complemental shell 8.

To move shell 20 to and from shell 8, there is provided a shaft 29, extending into slot 2, and having threads 30 at its left end, viewed from Fig. 1, for coaction with a threaded opening 31 in the lower end of brace 3. To the left end of shaft 29 is a disc 32 having a handle 33 whereby shaft 29 may be rotated clockwise or counter-clockwise. A coil spring 34 encompasses shaft 29, within slot 2, and has one end connected to brace 3 at 35 and the other end connected to brace 15 at 36. The right end of shaft 29 abuts brace 15 and the spring 34 tends to draw brace 15 towards brace 3, thus maintaining brace 15 in abutting relation against the right end of the shaft 29.

Immediately to the right of shell 8, as viewed in Figure 1, there is provided a fixed egg-holding member 37 of ring shape and having a manually operated set screw 38 at the top for holding an egg in position when inserted in the holding member 37. The holding member 37 is supported in fixed position by a block member 39 fixed on the base member 1. Spacing members 40 are provided at the corners of base member 1 to support the base member above a table and permit the sliding brace 15 to move freely.

In operation, an egg to be shelled or peeled is inserted in cup or shell 8 through holding member 37. The set screw 38 is tightened somewhat, just enough to hold the egg without cracking the shell. Then shaft 29 is rotated to move the shaft towards the left, as seen in Figure 1. While shaft 29 moves to the left, the spring 34 will draw brace 15 and shell or cup 20 towards the left. This operation is continued until shell 20 encompasses and contacts the protruding portion of the egg. Then with the egg shell in contact with the cutters 10–14 and 22–26, the shafts 4 and 17 are rotated causing the several cutters to cut through the egg shell making several parallel circumferential cuts through the shell. Then shaft 29 is rotated in the opposite direction to cause shell 20 to be withdrawn. Then the set screw 38 is loosened and the egg with its shell cut in several places is withdrawn for complete removal of the shell.

The egg peeler of this invention may be made of metal or metal and plastic combined. The cutters are preferably made of metal but the remaining structure may be of plastic material and many of the parts may be molded together as a unit.

It is apparent that the egg peeler of this invention provides a kitchen device which is simple, efficient and is designed for the convenience of the housewife.

While a certain specific embodiment of this invention has been shown, it will be understood that various modifications may be made within the spirit of the invention. Therefore no limitations on the invention are intended other than are imposed by the scope of the appended claim.

I claim:

A comestible peeling device comprising a base, a pair of confronting annular cutter members axially aligned on said base, one of said cutters being adjustable on said base toward and away from the other cutter, a holder fixed on said base intermediate said cutters, said holder including clamping means for holding a comestible stationary thereon, with portions of such comestible protruding therefrom axially of said cutters, said holder comprising a fixed annular member adapted to receive an intermediate portion of a comestible, and means for rotating said cutters.

PHILLIP KELLEY.

REFERENCES CITED

The following references are of record in the file of this patent:

UNITED STATES PATENTS

| Number | Name | Date |
|---|---|---|
| 170,017 | Richard | Nov. 16, 1875 |
| 886,229 | Mease | Apr. 28, 1908 |
| 1,021,969 | Cheney | Apr. 2, 1912 |
| 1,104,212 | Miller | July 21, 1914 |
| 1,127,548 | Turner | Feb. 9, 1915 |
| 1,841,239 | Caverly | Jan. 12, 1932 |

FOREIGN PATENTS

| Number | Country | Date |
|---|---|---|
| 10,011 | Great Britain | May 23, 1894 |